United States Patent
Willems

(10) Patent No.: US 9,539,873 B2
(45) Date of Patent: Jan. 10, 2017

(54) ROTARY DAMPER

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 51 days.

(21) Appl. No.: 14/693,331

(22) Filed: Apr. 22, 2015

(65) Prior Publication Data

US 2015/0306933 A1  Oct. 29, 2015

(30) Foreign Application Priority Data

Apr. 26, 2014  (DE) .......................... 10 2014 006 291

(51) Int. Cl.
| | | |
|---|---|---|
| *F16F 15/03* | (2006.01) | |
| *B60G 15/02* | (2006.01) | |
| *F16F 13/00* | (2006.01) | |
| *F16F 15/121* | (2006.01) | |

(52) U.S. Cl.
CPC ............ *B60G 15/02* (2013.01); *F16F 13/005* (2013.01); *F16F 15/035* (2013.01); *F16F 15/1213* (2013.01); *B60G 2202/30* (2013.01); *B60G 2500/10* (2013.01)

(58) Field of Classification Search
CPC .... F16F 15/035; F16F 15/1213; F16F 13/005; B60G 15/02; B60G 2202/30; B60G 2500/10
See application file for complete search history.

(56) References Cited

U.S. PATENT DOCUMENTS

| | | | | |
|---|---|---|---|---|
| 1,584,075 | A | * 5/1926 | Boone ................... | F16F 9/145 188/306 |
| 1,752,844 | A | * 4/1930 | Harrison ............... | B60G 13/14 188/267 |
| 1,883,436 | A | * 10/1932 | Thayer ................... | F16F 9/145 188/309 |

(Continued)

FOREIGN PATENT DOCUMENTS

| | | |
|---|---|---|
| CN | 1120637 | 4/1996 |
| CN | 1667293 | 9/2005 |

(Continued)

OTHER PUBLICATIONS

Chinese Search Report issued on Sep. 27, 2016 with respect to counterpart Chinese patent application 201510190792.8.

(Continued)

*Primary Examiner* — Bradley King
(74) *Attorney, Agent, or Firm* — Henry M. Feiereisen LLC

(57) ABSTRACT

A rotary damper includes a damper motor and a damper housing in surrounding relationship to the damper motor. The damper housing has a connection piece for mounting the damper housing to a first mass. An articulated lever is swingably mounted in relation to the damper housing and connected to a second mass. The articulated lever has a lobe which is movable during a swinging motion of the articulated lever in relation to the damper housing along a movement path between two stops which are connected to the damper housing. A gear mechanism transmits and/or converts a relative rotational movement between the first and second masses to the damper motor for vibration damping.

5 Claims, 3 Drawing Sheets

(56) References Cited

U.S. PATENT DOCUMENTS

| | | | | |
|---|---|---|---|---|
| 1,958,905 | A | * | 5/1934 | Anderson ............... B60G 7/04 16/44 |
| 2,367,993 | A | * | 1/1945 | Bishop ................. B64C 25/505 16/35 D |
| 2,606,534 | A | * | 8/1952 | Pond ...................... F15B 15/12 188/306 |
| 2,724,587 | A | | 11/1955 | Trembley |
| 2,861,796 | A | | 11/1958 | Rohr |
| 4,411,341 | A | * | 10/1983 | Schultz ................. F16F 9/145 16/57 |
| 9,205,716 | B2 | * | 12/2015 | Yoo ....................... B60G 7/006 |
| 2012/0305343 | A1 | * | 12/2012 | Ebner .................. F16D 65/567 188/71.8 |
| 2013/0049508 | A1 | | 2/2013 | Willems |
| 2013/0154277 | A1 | | 6/2013 | Willems |
| 2013/0154404 | A1 | | 6/2013 | Willems |
| 2013/0320791 | A1 | | 12/2013 | Willems |
| 2014/0300072 | A1 | | 10/2014 | Willems |
| 2014/0360825 | A1 | | 12/2014 | Willems |

FOREIGN PATENT DOCUMENTS

| | | |
|---|---|---|
| CN | 101460763 | 6/2009 |
| DE | 533299 C | 9/1933 |
| DE | 198 34 558 A1 | 2/2000 |
| DE | 10 2011 009 608 A1 | 8/2012 |
| DE | 10 2011 101 350 A1 | 11/2012 |
| DE | 10 2011 101 701 A1 | 11/2012 |
| DE | 10 2011 102 743 A1 | 11/2012 |
| DE | 10 2012 009 168 A1 | 11/2013 |
| EP | 1 354 731 A1 | 10/2003 |
| EP | 1 935 679 A1 | 6/2008 |
| GB | 1521728 | 10/1975 |
| JP | 7-98041 | 4/1995 |
| JP | 2012-1879880 A | 10/2012 |
| WO | 2013/138912 A1 | 9/2013 |

OTHER PUBLICATIONS

Translation of Chinese Search Report issued on Sep. 27, 2016 with respect to counterpart Chinese patent application 201510190792.8.

* cited by examiner

ROTARY DAMPER

CROSS-REFERENCES TO RELATED APPLICATIONS

This application claims the priority of German Patent Application, Ser. No. 10 2014 006 291.0, filed Apr. 26, 2014, pursuant to 35 U.S.C. 119(a)-(d), the disclosure of which is incorporated herein by reference in its entirety as if fully set forth herein.

BACKGROUND OF THE INVENTION

The present invention relates to a rotary damper.

The following discussion of related art is provided to assist the reader in understanding the advantages of the invention, and is not to be construed as an admission that this related art is prior art to this invention.

WO 2013/138912 A1 discloses a torque limiting assembly for use with an actuator having a torque transfer output. The assembly includes a brake pad, a band connected at a first extremity to a first extremity of the brake pad and a cam linking a second extremity of the band to a second extremity of the brake pad. The brake pad and the band are configured to wrap around a torque transfer output and the positioning of the cam in a first position frictionally engages the brake pad and the band with the a torque transfer output while the positioning of the cam in a second position disengages the brake pad and the band with the a torque transfer output. The presence of such a torque brake is inadequate to ensure a reliable limitation of the rotation movement of a rotating mass in relation to a fixed mass.

It would be desirable and advantageous to provide an improved rotary damper which obviates prior art shortcomings and which is simple in structure, compact, and yet reliable in operation.

SUMMARY OF THE INVENTION

According to one aspect of the present invention, a rotary damper includes a damper motor, a damper housing in surrounding relationship to the damper motor, the damper housing having a connection piece for mounting the damper housing to a first mass, an articulated lever swingably mounted in relation to the damper housing and connected to a second mass, the articulated lever having a lobe movable during a swinging motion of the articulated lever in relation to the damper housing along a movement path between two stops which are connected to the damper housing, and a gear mechanism configured to transmit and/or convert a relative rotational motion between the first and second masses to the damper motor for vibration damping.

According to another advantageous feature of the present invention, the stops in the movement path of the articulated lever can be integrated in the damper housing to thereby form a unitary structure. The provision of a unitary structure has benefits in terms of installation space in a vehicle and assembly.

According to another advantageous feature of the present invention, damping parts can be arranged on the stops in the movement path of the lobe. The damping parts attenuate a movement of the articulated lever to thereby advantageously prevent mechanical stress on the rotary damper and reduce noise when the articulated lever reaches the end positions defined by the stops.

According to another advantageous feature of the present invention, the damping parts can be configured as springs. The provision of springs as damping parts results in a smooth deceleration of the articulated lever as it swings, in particular at the end of the swinging motion.

According to another advantageous feature of the present invention, the springs can be arranged in a circumferential direction of the rotary damper and can be supported on the stops. Advantageously, the springs are helical springs and can be guided in the damper housing. As a result, the helical springs can easily be integrated in the damper housing of the rotary damper, and there is no need for additional manipulations. It is, of course, conceivable to use other types of springs, although the use of helical springs is currently preferred because they are inexpensively to manufacture and easy to handle.

According to another advantageous feature of the present invention, the lobe can be configured trapezoidal in cross section to define two parallel trapeze sides and two slanted sides, with a shorter one of the two parallel trapeze sides positioned adjacent to the articulated lever, and with the slanted trapeze sides forming support surfaces for the damper parts or springs. By supporting the damper parts of springs on the lobe of the articulated lever, an even load is applied onto the spring ends that rest against the lobe. Thus, pressure on the damper parts or springs is evenly dispersed, when the articulated lever swings to its end positions.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
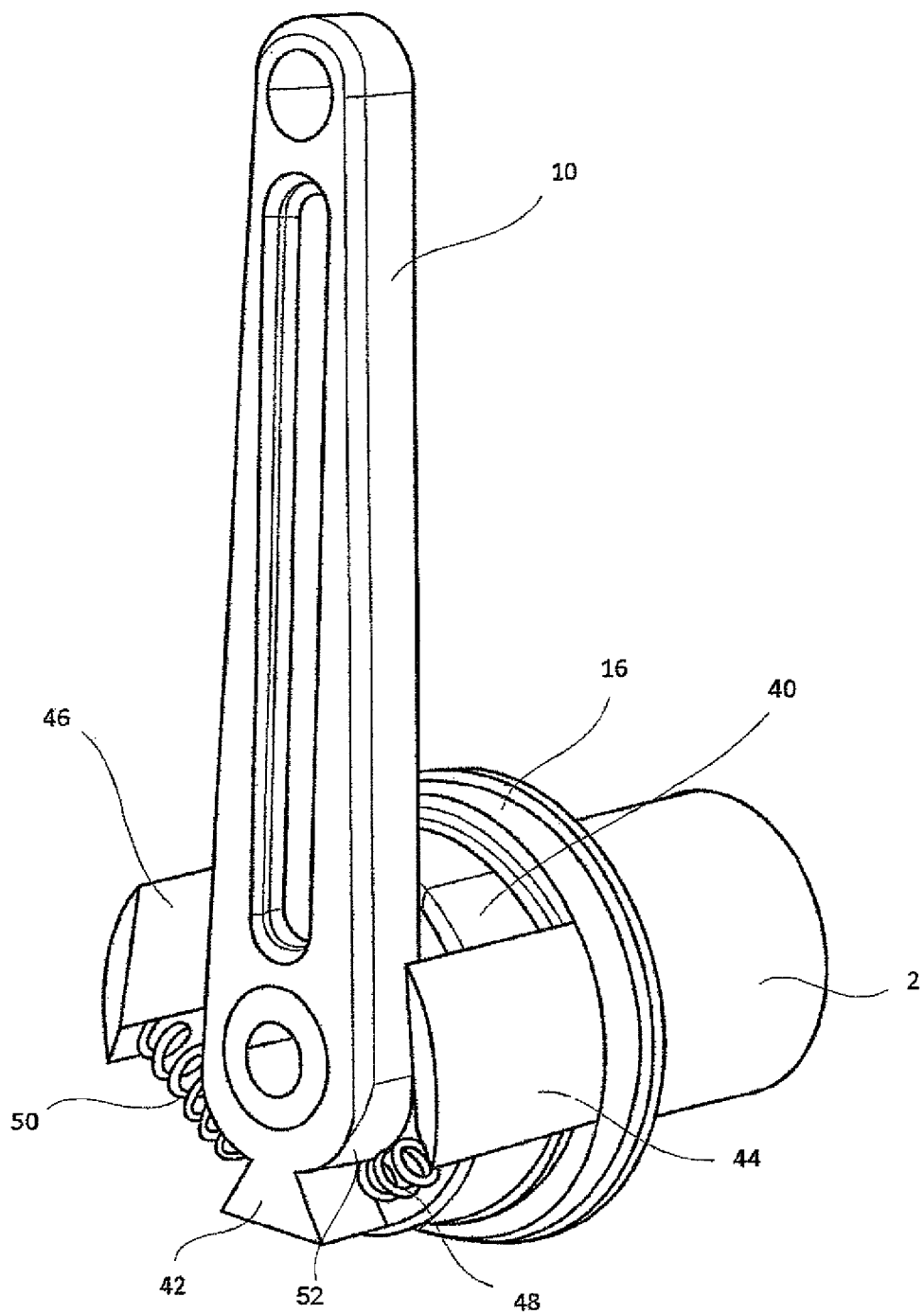
FIG. 1 is a sectional view of a rotary damper according to the present invention along a plane in longitudinal direction of the rotary damper.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a sectional view of a rotary damper according to the present invention, along a plane in longitudinal direction of the rotary damper. The rotary damper includes a damper housing 2 in surrounding relationship to an electromagnetic damper motor 4 (FIG. 3) which has a stator 6, a rotor 8 arranged in the stator, and a device to generate a magnetic field on the rotor 8 and the stator 6. The damper housing 2 has a connection piece (not shown) for securement to a first mass. An articulated lever 10 of the rotary damper is swingably mounted in relation to the damper housing 2 and connected to a second mass. The rotary damper further includes a gear mechanism 12, configured as a strain wave gear, for transmitting and/or converting a relative rotational motion between the masses onto the damper motor 4 for vibration damping.

Figure 3:
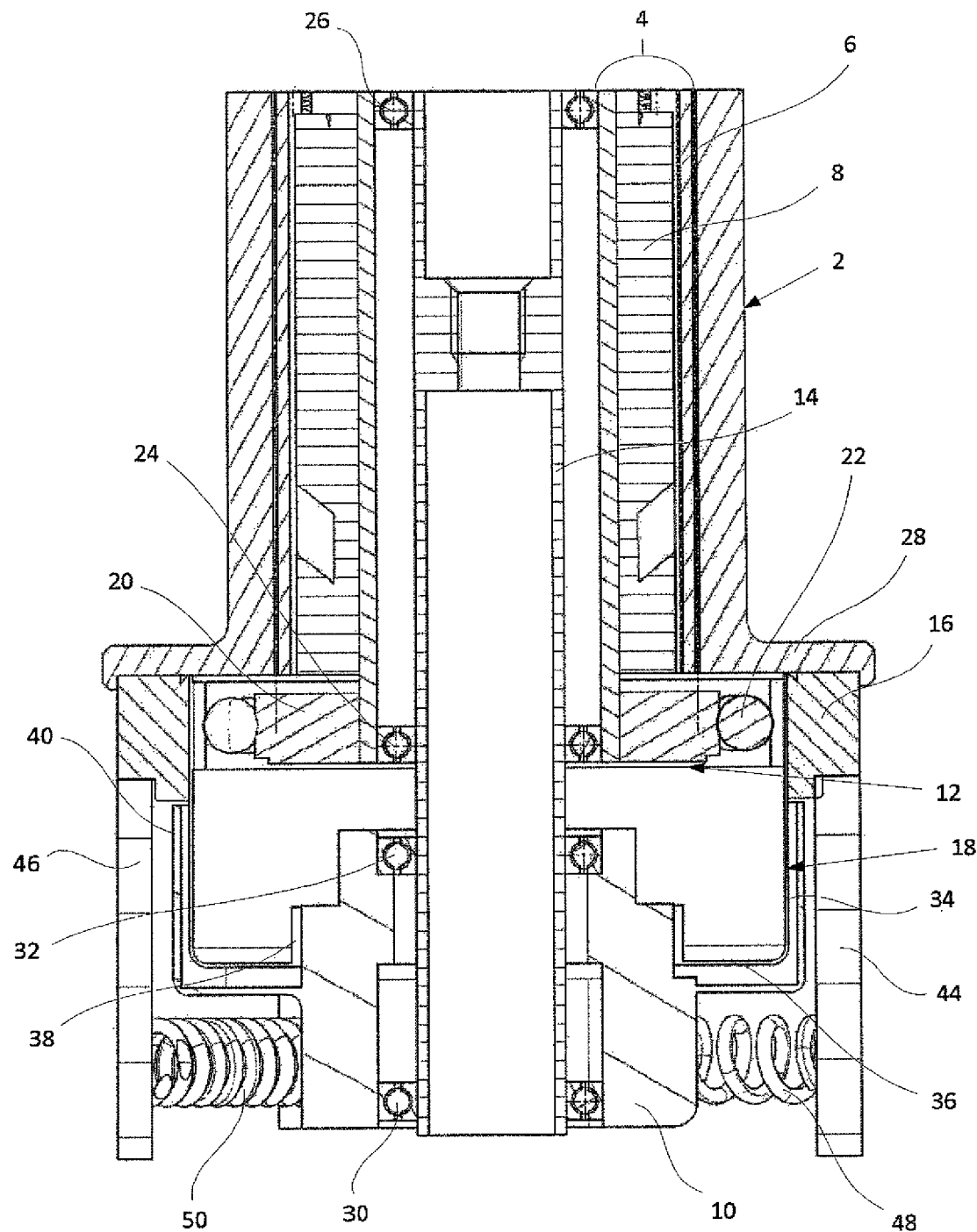
FIG. 3 is a frontal view of the rotary damper according to the present invention of FIG. 1.

As shown in particular in FIG. 3, the rotor 8 is rotatably supported on a bearing part 14 in coaxial relation to the damper housing 2, whereas the stator 6 is mounted to the damper housing 2. The rotor 8 can include a magnetic assembly, whereas the stator 6 may include a coil assembly to which current can be applied. This is typical for damper motors 4 of this type.

The gear mechanism 12 in the form of a strain wave gear has internal teeth, a rigid unit 16, a flexible unit 18 having external teeth, and an oval wave generator 20 which is rotatably supported in the flexible unit 18. Rotation of the wave generator 20 causes a deformation of the flexible unit 18, with the rigid unit 16 and the flexible unit 18 being coupled to one another via the meshing internal and external teeth. Arranged between the flexible unit 18 and the wave generator 20 is a flexible rolling-contact bearing 22. The rotor 8 of the gear mechanism 12 is rotatably supported on the bearing part 14 via rolling contact bearings 24, 26.

The rigid unit 16 is connected to a radial wall 28 of the damper housing 2, whereas the wave generator 20 is connected to the rotor 8 of the damper motor 4. The flexible unit 18 is connected to the articulated lever 10 which, in turn, is supported on the bearing part 14 via rolling-contact bearings 30, 32. The flexible unit 18 has an axial wall portion 34, a radial wall portion 36, and a further axial wall portion 38 which is secured to the articulated lever 10. Arranged on the articulated lever 10 is a cup-shaped housing part 40 to cover the flexible unit 18 in the region between the rigid unit 16 and the articulated lever 10 and thereby prevent ingress of dirt particles.

The damper housing 2 may be connected to a vehicle body via the bearing part 14, with the articulated lever 10 being arranged at the other end of the damper housing 2 and driving the damper motor 4.

As a vehicle wheel jounces and rebounds, the articulated lever 10 swings about an angle in relation to the damper housing 2. As a result of this swinging motion, the damper motor 4 applies a recoiling force. As a result of the rotation speed, the rotary damper generates hereby a damping force.

Figure 2:
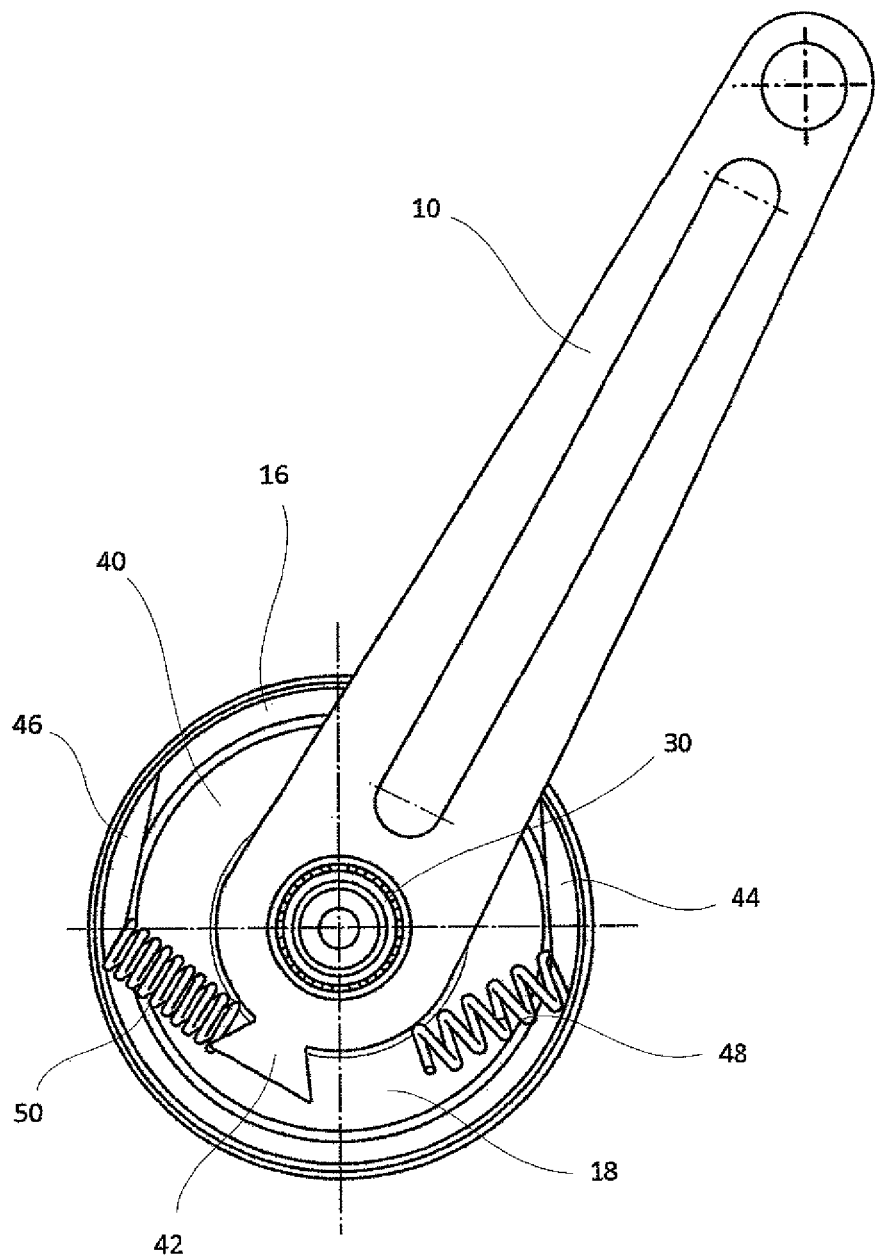
FIG. 2 is a perspective illustration of the rotary damper according to the present invention.

As is readily apparent from FIGS. 1 and 2, the articulated lever 10 has a lobe 42 which moves along a movement path between two stops 44, 46, as the articulated lever 10 swings in relation to the damper housing 2. The stops 44, 46 are connected to the damper housing 2 via the rigid unit 16. The lobe 42 is trapezoidal in cross section to define two parallel trapeze sides and two slanted sides, with a shorter one of the two parallel trapeze sides positioned adjacent to the articulated lever 10.

Damping parts in the form of springs 48, 50 are further arranged on the stops 44, 46 in the movement path of the lobe 42 and extend in circumferential direction of the rotary damper. The stops 44, 46 are supported with their one end on the slanted trapeze sides of the lobe 42, respectively, and supported with their other end upon the stops 44, 46.

The springs 48, 50 may involve basically any type of spring. Currently preferred is, however, a configuration of the springs 48, 50 as helical springs, as shown in the non-limiting example of the drawing. The springs 48, 50 are hereby guided in the damper housing 2 by a cover (not shown), a radial portion 52 of the articulated lever 10, and the stops 44, 46.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated. In particular, damper motors other than electromagnetic damper motors or gear mechanisms other than strain wave gears may be used, without departing from the scope of the present invention.

What is claimed as new and desired to be protected by Letters Patent is set forth in the appended claims and includes equivalents of the elements recited therein:

1. A rotary damper, comprising:
    a damper motor;
    a damper housing in surrounding relationship to the damper motor, said damper housing having a connection piece for mounting the damper housing to a first mass;
    an articulated lever swingably mounted in relation to the damper housing and connected to a second mass, said articulated lever having a lobe movable during a swinging motion of the articulated lever in relation to the damper housing along a movement path between two stops which are connected to the damper housing;
    a gear mechanism configured to transmit and/or convert a relative rotational movement between the first and second masses to the damper motor for vibration damping; and
    damping parts arranged on the stops in the movement path of the lobe, wherein the damping parts are helical springs.

2. The rotary damper of claim 1, wherein the springs are arranged in a circumferential direction of the rotary damper and supported on the stops.

3. The rotary damper of claim 1, wherein the damping parts are guided in the damper housing.

4. A rotary damper, comprising:
    a damper motor;
    a damper housing in surrounding relationship to the damper motor, said damper housing having a connection piece for mounting the damper housing to a first mass;
    an articulated lever swingably mounted in relation to the damper housing and connected to a second mass, said articulated lever having a lobe movable during a swinging motion of the articulated lever in relation to the damper housing along a movement path between two stops which are connected to the damper housing;
    a gear mechanism configured to transmit and/or convert a relative rotational movement between the first and second masses to the damper motor for vibration damping; and
    damping parts arranged on the stops in the movement path of the lobe, wherein the lobe is trapezoidal in cross section to define two parallel trapeze sides and two slanted sides, with a shorter one of the two parallel trapeze sides positioned adjacent to the articulated lever, and with the slanted trapeze sides forming support surfaces for the damper parts.

5. The rotary damper of claim 4, wherein the stops in the movement path of the articulated lever are integrated in the damper housing to thereby form a unitary structure.

* * * * *